L. J. MEYERS.
LENS SIGN.
APPLICATION FILED SEPT. 18, 1913.

1,116,831.

Patented Nov. 10, 1914.

Witnesses
Robert Karcher
Hazel Owen

Inventor
Louis J. Meyers.

By Bond & Miller
Attorneys

UNITED STATES PATENT OFFICE.

LOUIS J. MEYERS, OF CANTON, OHIO, ASSIGNOR, BY DIRECT AND MESNE ASSIGNMENTS, TO CHARLES VIGNOS, OF CANTON, OHIO.

LENS-SIGN.

1,116,831. Specification of Letters Patent. Patented Nov. 10, 1914.

Application filed September 18, 1913. Serial No. 790,546.

*To all whom it may concern:*

Be it known that I, LOUIS J. MEYERS, a citizen of the United States, residing at Canton, in the county of Stark and State of Ohio, have invented a new and useful Lens-Sign, of which the following is a specification.

My invention relates to improvements in signs adapted to be illuminated by light from the rear of the sign transmitted through lenses in the face of the sign. While such signs may be illuminated by various kinds of light, electric light is more commonly employed and while said lenses may be made of various translucent material, they are commonly made of glass.

More specifically my invention relates to a sign of the character described provided with a sheet metal front having lens apertures and glass lenses and to the means for fastening said lenses to said front.

The objects of the invention are to generally improve constructions of the character mentioned, to provide a fastening means for said lenses which will be certain in operation and will prevent the lenses from becoming loose or unintentionally separated from the sign front, to prevent the rattling of said lenses after the same are connected to the sign front and to provide for the convenient connection and disconnection of said lenses when desired. These objects, together with other objects apparent to those skilled in the art may be attained by the construction illustrated in the accompanying drawings, although the invention may be embodied in other forms, the construction illustrated being chosen by way of example.

Figures 1, 2, 3:
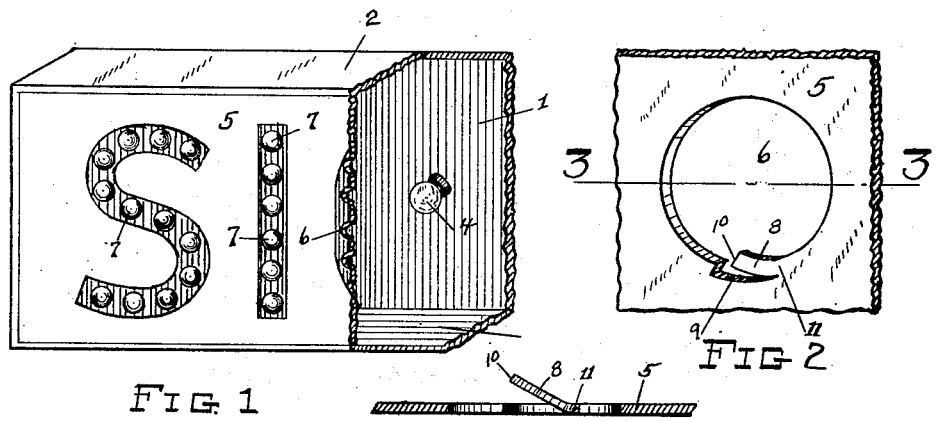
Figures 4, 5, 6:
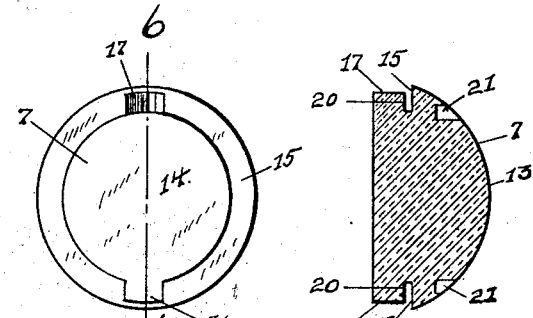
Figures 7, 8:
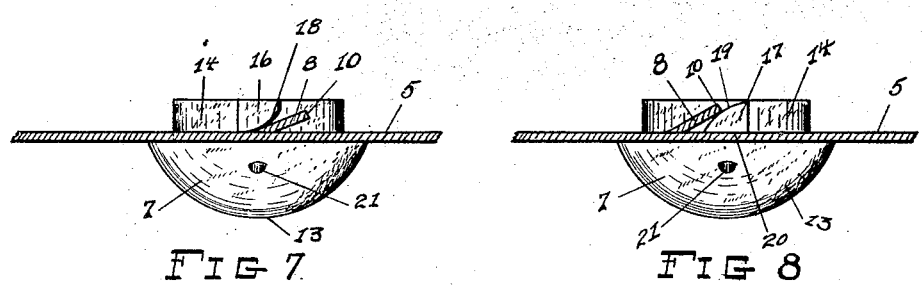

In the drawings: Figure 1 is a fragmentary perspective view of an illuminated sign embodying my invention. Fig. 2 is a fragmentary plan view of a portion of the sign front provided with a sign aperture in accordance with my invention. Fig. 3 is a sectional view on the line 3—3, Fig. 2. Fig. 4 is a front elevation of a lens made in accordance with my invention. Fig. 5 is a rear elevation of the same. Fig. 6 is a sectional view on the line 6—6, Fig. 5. Fig. 7 is a view of a lens of my invented construction arranged in the sign front and one of the lugs and one of the lugs in position to lock the retaining tang. Fig. 8 is a similar view showing the other lug in position for unlocking the retaining tang.

Throughout the several views similar reference numerals indicate similar parts.

Referring particularly to Fig. 1 the numeral 1 indicates the back, the numeral 2 the top and the numeral 3 the bottom of the sign. Preferably connected to the back 1 are the electric lamps 4 and connected at the forward edges of the top and bottom 2 and 3 is the sheet metal sign front 5 provided with apertures 6 for the reception of the translucent lenses 7. Said apertures and lenses are arranged in appropriate relative positions to form any desired word or symbol as will be well understood.

More specifically referring to the particular construction embodying my invention it will be noted that each aperture 6 is substantially round and the margin of said aperture, preferably at the bottom portion thereof is provided with a retaining tang 8, the inner margin of which is continuous with the margin of the aperture 6 and the outer margin 9 of which is preferably concentric with the inner margin. The said tang 8 is provided with a free end 10 and at 11 is continuous with the sign front, the free end 10 being bent inwardly from the plane of the front 5, and preferably extending in clockwise direction as viewed from the front of the same.

The lens 7 is provided with a convex bull's-eye front portion 13 and with an integral cylindrical shank portion 14. The shank 14 is of considerably less diameter than the greatest diameter of the bull's-eye portion, thus forming an annular shoulder 15 adapted to engage the front surface of the sign front 5 around the margin of the aperture 6. Formed integrally with the shank portion 14 are two diametrically opposite lugs 16 and 17. Said lugs do not extend into engagement with the shoulder 15 but are spaced therefrom a distance substantially equal to the thickness of the front 5. The lug 16 on the outer face, adjacent the shoulder 15 is provided with the curved tang engaging surface 18 whereas the lug 17, on the inner side away from the shoulder 15 is provided with the curved tang engaging surface 19. As viewed from the front or bull's-eye side of the lens the curved surface 18 is clockwardly directed whereas the curved tang engaging surface 19 is contra-clockwardly directed.

In attaching a lens of the character described to the lens front the lug 16 is entered into the aperture 6 on the side thereof opposite the tang 8 and the lens upwardly moved until the shank 14 engages the curved edge of the aperture 6 with the lug 16 lying back of the front 5. The lug 17 may then be entered into the notch formed by the tang 8 by a tilting movement of the lens to bring the shoulder 15 into flat engagement with the face of the sign front 5 entirely around the aperture 6. By a clockwise rotation of the lens, when in this position, the curved edge 18 will be brought into engagement with the tang 8, as illustrated in Fig. 7, and by further continuing the rotation the lug 8 will be bent down substantially into the plane of the sign front 5. It is preferable to then continue the rotation of the lens in clockwise direction until the flat outer surface 20 of the lug 17 is brought over the tang 8. It will be understood that by reason of the resiliency of the metal, the said tang will have a tendency to spring backward, slightly from the plane of the front 5 and by engagement with the flat under surface 20 of the lug 17 will prevent any looseness or rattling of the lens in the aperture 6. It will be obvious however that the lug 16 may be permitted to overlie the tang 8 and will, to a large extent accomplish the same result, except that the surface 20 is of somewhat greater extent than the inner surface of the lug 16. When it is desired to remove a lens so connected the lens should be rotated in contra-clockwise direction, which will bring the lug 17 into engagement with the free end 10 of the tang 8. The said end 10, by further rotation of the lens in contra-clockwise direction, will be caused to ride up the curved surface 19 thus bending the tang 8 backwardly and permitting the lug 17 to be removed frontwardly through the notch produced by the displacement of the tang 8.

For the purpose of providing means for conveniently rotating the lens 12 wrench sockets 21 may be provided in the bull's-eye portion of the lens to receive a wrench as will be well understood from an inspection of the drawings. While I have shown said sockets as formed by two diametrically opposite holes extending into the body of the bull's-eye portion near the margin thereof it is evident that instead of sockets, outwardly projecting lugs might be provided, or the edge of the bull's-eye may be formed with parallel flattened surfaces adapted for engagement with the jaws of a wrench.

Although the above description in connection with the drawings, discloses the best mode in which I have contemplated embodying my invention, I do not desire to be limited to the details of construction thus disclosed, for many changes may be made as circumstances require or experience suggests without departing from the spirit of the invention within the scope of the appended claims.

I claim—

1. A lens sign comprising a sheet metal front provided with a substantially circular lens aperture and an integral tang formed at the margin of said aperture and having a free end extending inwardly from the plane of said sign front, and a lens having a shank of a size to be a turning fit for said aperture and provided with a lug adapted to engage said tang and, by rotation of said lens, adapted to bend said tang into the plane of said front.

2. A lens sign comprising a sheet metal front provided with a substantially circular lens aperture and an integral tang formed at the margin of said aperture and having a free end extending inwardly from the plane of said sign front, and a lens having a shank of a size to be a turning fit for said aperture and provided with a lug adapted to engage said tang and, by rotation of said lens, adapted to bend said tang into the plane of said front, and a second lug adapted to engage said tang when said lens is rotated in the opposite direction to bend said tang out of the plane of said front.

In testimony that I claim the above, I have hereunto subscribed my name in the presence of two witnesses.

LOUIS J. MEYERS.

Witnesses:
   SYLVIA BORON,
   WILLIAM H. MILLER.